W. BALLOU.
LOCK FOR ENGINE HOODS.
APPLICATION FILED MAR. 21, 1913.

1,102,229.

Patented July 7, 1914.
2 SHEETS—SHEET 1.

Witnesses
R. N. Jones,
R. M. Smith.

Inventor
W. Ballou.
By N. Randolph Jr.
Attorney

W. BALLOU.
LOCK FOR ENGINE HOODS.
APPLICATION FILED MAR. 21, 1913.
1,102,229.
Patented July 7, 1914.
2 SHEETS—SHEET 2.
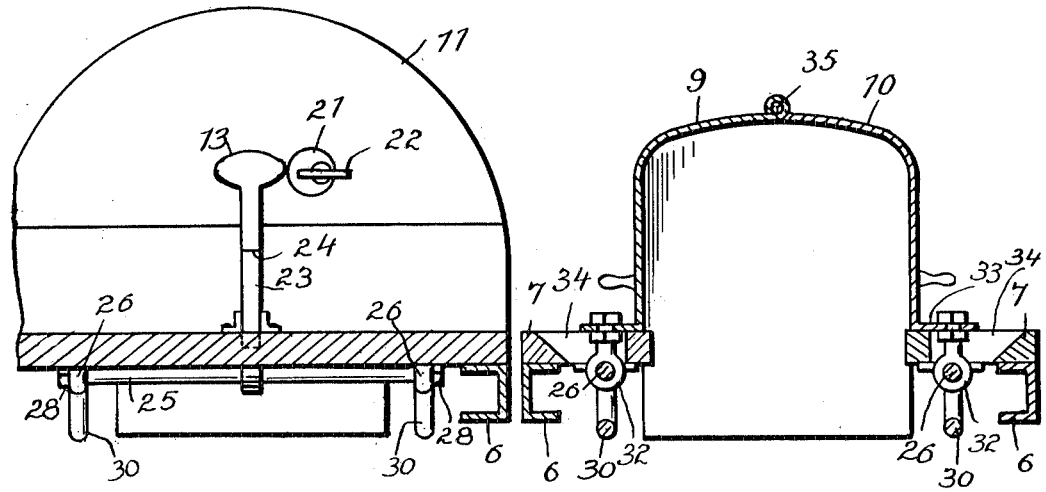
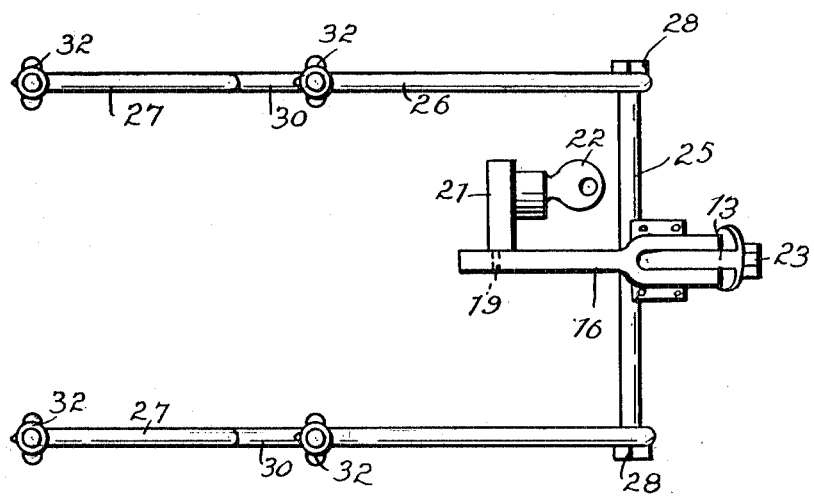
Witnesses
P. N. Jones
R. M. Smith
Inventor
W. Ballou.
By N. Randolph Jr.
Attorney.

UNITED STATES PATENT OFFICE.

WILLIAM BALLOU, OF BELLINGHAM, MINNESOTA.

LOCK FOR ENGINE-HOODS.

1,102,229. Specification of Letters Patent. Patented July 7, 1914.

Application filed March 21, 1913. Serial No. 755,994.

*To all whom it may concern:*

Be it known that I, WILLIAM BALLOU, a citizen of the United States, residing at Bellingham, in the county of Lac qui Parle and State of Minnesota, have invented certain new and useful Improvements in Locks for Engine-Hoods; and I do hereby declare the following to be a full, clear, and exact description of the invention, such as will enable others skilled in the art to which it appertains to make and use the same.

This invention comprehends improvements in locks for engine hoods and relates more particularly to means whereby the hoods covering the engines of motor vehicles may be conveniently locked against the frame.

Another and more specific object of the invention resides in the provision of locking means of this nature which may be operated from the driver's seat and which when in operative position, will effectually prevent the hood sections being raised.

Another and more specific object of the invention resides in the provision of locking means of this nature, which shall be semi-automatic in operation, simple, durable, and capable of easy application to the common types of motor vehicles now in use.

With these and other objects in view, as will become more apparent as the description proceeds, the invention consists in certain novel features of construction, combination, and arrangement of parts, as will be hereinafter described and claimed.

Figure 1:
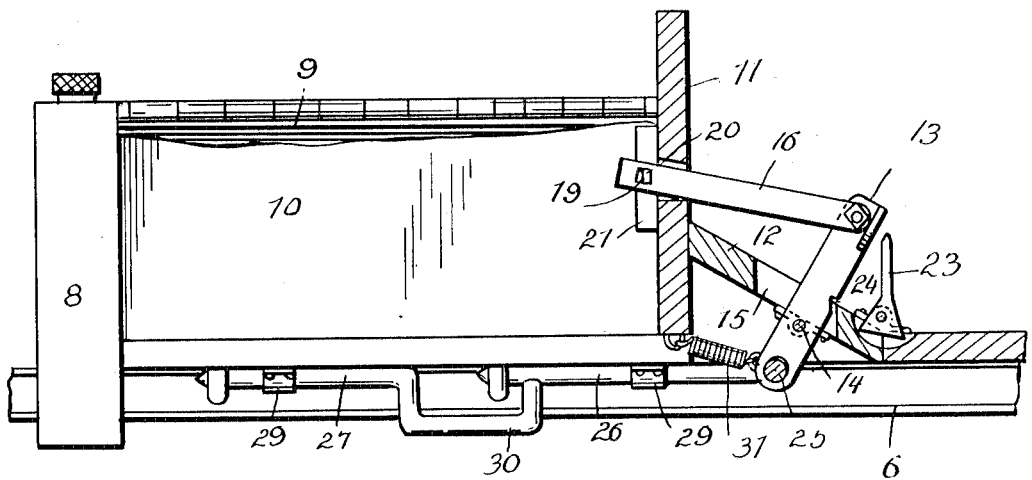
Figure 2:
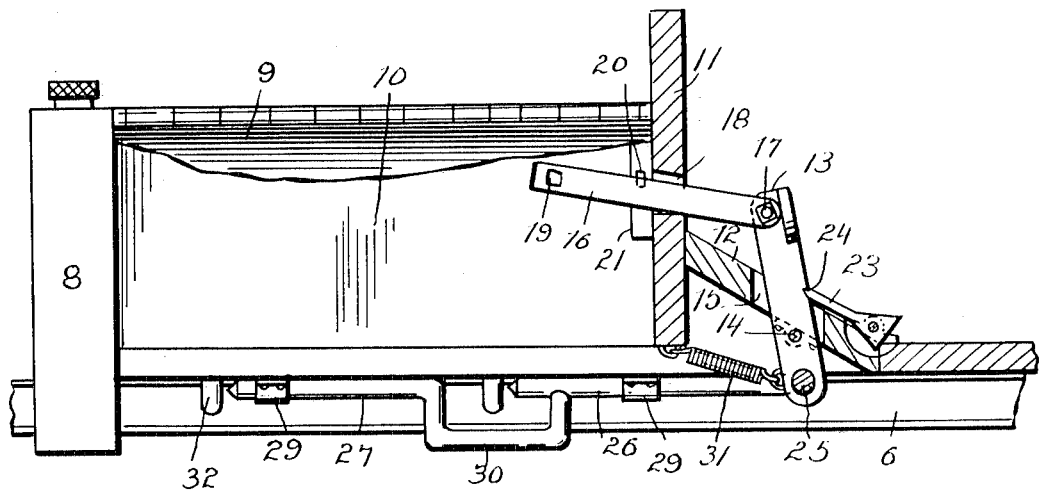

For a complete understanding of the invention reference is to be had to the following description and accompanying drawing, in which, Figure 1 is a side elevation partly in section and partly broken away, showing my improved locking means in operative position upon a motor vehicle, Fig. 2 is a similar view, showing the locking means in its inoperative position, Fig. 3 is a view looking against the right hand end of Fig. 1, Fig. 4 is a vertical sectional view through the hood and a portion of the locking means, and, Fig. 5 is a top plan view of the locking means *per se*.

Referring in detail to the drawings by numerals, 6 designates the frame of a motor vehicle, 7 supporting bars attached thereto, 8 the radiator, and 9 and 10 the hinged sections which form the hood. These parts as well as the dash-board 11 and foot-board 12, may be of any desired construction and are only shown to illustrate the application of my locking mechanism.

The locking mechanism includes a foot lever 13 which is pivotally mounted intermediate its ends upon a supporting rod 14 which extends under the foot-board 12. The lever works through a slot 15 formed in the foot-board and has pivotally connected adjacent its upper extremity a forwardly extending lock bar 16, said bar being bifurcated at its inner end and secured to the lever by means of a fastener 17. The lock bar slides through an opening 18 formed in the dash-board and is formed adjacent its outer end with an opening 19 through which a latch 20 is adapted to project so as to hold the bar against movement. This latch is spring-pressed and forms part of a lock 21 which is positioned within the hood and attached to the dash-board 11. The latch may be retracted by means of a removable key 22 which may be inserted into the lock through the dash-board. A pawl 23 is pivotally supported upon the foot-board and by engaging in a notch 24 serves to hold the upper end of the foot lever in its forward position.

A transverse rod 25 extends through and is rigidly fixed within an opening formed adjacent the lower terminal of the foot lever and is provided for the purpose of reciprocating the locking pins 26 and 27. Locking pins 26 are held on the rod 25 by means of the nuts 28. These pins 26 and 27 are supported under the bars 7 by means of the guide brackets 29. The pins 26 are straight whereas the pins 27 are formed with off-set portions 30 which are connected at their inner ends to the first mentioned pins at a distance from their outer ends, as clearly shown in Fig. 1.

A contractile spiral spring 31 tends to hold the locking pins in their forward position, at which time they project through eye-bolts 32 depending from the laterally projecting flanges 33 of the hood sections 9 and 10. The flanges rest upon the supporting bars 7, which latter are slotted, as indicated at 34, to permit the hood sections being swung about the pintle 35.

Having described my locking mechanism, it now remains to explain the operation thereof: When the parts are arranged as shown in Fig. 1, the locking pins 26 and 27 extend through the eye-bolts 32 and make it impossible to raise the hood sections. The spring latch 20 is extended through the opening 19 in the lock bar so that it is impossible to actuate the foot lever so as to retract the locking pins. Before this last operation can be accomplished the spring latch 20 must be retracted and this can only be done by inserting a proper key within the lock 21. Having withdrawn the spring latch from the aperture 19, the upper terminal of the foot lever may be forced forwardly and held in such position by means of the pawl 23. The forward movement of the upper terminal of the foot lever swings the transverse bar 25 rearwardly and the locking pins are withdrawn from the eye-bolts.

From the foregoing description taken in connection with the accompanying drawing, it will be apparent that I have provided an extremely simple and efficient locking mechanism which will effectually prevent the hood being opened by unauthorized persons.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

1. The combination with a motor vehicle, including an engine hood, of eye-bolts depending from said hood through slots formed in the frame of the vehicle, sliding fasteners positioned under said frame and adapted to extend through the eye-bolts, a foot lever pivoted intermediate its ends to the foot-board of the vehicle, means connecting said lever with the sliding fasteners, spring means for holding said fasteners normally in their operative positions, and means for locking the foot lever against movement.

2. The combination with a motor vehicle, including an engine hood, of eye-bolts depending from said hood through slots formed in the frame of the vehicle, sliding fasteners positioned under said frame and adapted to extend through the eye-bolts, a foot lever pivoted intermediate its ends to the foot-board of the vehicle, means connecting said lever with the sliding fasteners, spring means for holding said fasteners normally in their operative position, a lock bar connected at one end to the foot lever and projecting into said hood, and key actuated means for engagement with said lock bar whereby the same is held against movement.

In testimony whereof I affix my signature in presence of two witnesses.

WILLIAM BALLOU.

Witnesses:
JULIUS F. CLARK,
L. L. KROUSS.